United States Patent [19]

Kwok et al.

[11] Patent Number: 4,471,082

[45] Date of Patent: Sep. 11, 1984

[54] ADHESIVES AND USES THEREOF

[75] Inventors: John C. Kwok; Ivan S. Lee, both of Sarnia, Canada

[73] Assignee: Polysar Limited, Sarnia, Canada

[21] Appl. No.: 447,792

[22] Filed: Dec. 8, 1982

Related U.S. Application Data

[62] Division of Ser. No. 214,765, Dec. 9, 1980, Pat. No. 4,374,848.

[51] Int. Cl.$^3$ .......................... C08L 1/26; C08L 3/02; C09J 3/12; B32B 3/02
[52] U.S. Cl. ........................................ 524/46; 524/42; 524/43; 524/44; 524/45; 524/47; 524/502; 524/571; 524/573; 156/328; 156/336
[58] Field of Search ................... 524/46, 47, 501, 502, 524/503, 514, 515, 571, 573; 156/326, 327, 328, 336, 308.8

[56] References Cited

U.S. PATENT DOCUMENTS

| | | | |
|---|---|---|---|
| 2,850,468 | 9/1958 | Giggey | 524/53 |
| 3,062,762 | 11/1962 | Rice et al. | 156/328 |
| 3,425,968 | 2/1969 | Reiling | 524/47 |
| 3,484,338 | 12/1969 | Britton et al. | 161/216 |

FOREIGN PATENT DOCUMENTS

| | | |
|---|---|---|
| 1065713 | 4/1967 | United Kingdom . |
| 1065714 | 4/1967 | United Kingdom . |

Primary Examiner—John Kight, III
Assistant Examiner—Nathan M. Nutter
Attorney, Agent, or Firm—Stevens, Davis, Miller & Mosher

[57] ABSTRACT

An adhesive composition comprising a mixture of water based polymer in latex form and a material generally referred to as a thickening agent is disclosed for removably adhering a product to a substrate, for example a carpet with an attached backing to a flooring substrate. The adhesive may be applied as a layer to the carpet backing, dried and subsequently activated with water to adhere the carpet to the floor. After drying, the adhesive layer may be reactivated with water to permit the carpet to be removed from the floor. The adhesive layer when dried on the surface of a latex foam backed carpet provides a non-tacky surface which additionally increases the abrasion resistance of the latex foam backing thereby reducing damage to the backing during normal storage and handling.

7 Claims, No Drawings

ADHESIVES AND USES THEREOF

This is a division of application Ser. No. 214,765 filed Dec. 9, 1980 U.S. Pat. No. 4,374,848.

BACKGROUND OF THE INVENTION

1. Field of the Invention

This invention relates to adhesives and the use of such adhesives for adhering a material to a substrate, for example, for adhering a carpet having an attached foam backing to a flooring substrate, one advantage of the adhesive being that it may readily be reactivated to permit removal of the adhering material from the substrate.

2. Description of the Prior Art

Many methods and adhesive materials are known in the prior art for the adhesion of a material to a substrate. A paper product may be adhered to a solid substrate, a wallpaper may be adhered to a plaster wall, a label may be adhered to a variety of solid substrates, a decorative item may be applied to a wall, a cupboard, or a metal panel such as in a car, or a foam backed carpet may be applied to a solid substrate, e.g. a concrete floor. The adhesive material used will depend on the particular material and substrate combination and the method of achieving the adhesion will vary from one particular use to another.

U.S. Pat. No. 3,704,197 teaches a removable carpet tile comprising a foam backed carpet and a water-dispersed acrylic adhesive with high tack applied with a figurated roller to the outer surface of the foam backing for adhesion of the carpet to a substrate, only 10 to 50% of the foam backing being treated with adhesive with the constraint that the peel strength of the adhesive is from 0.1 to 0.9 lbs/in and thereby less than the delamination strength (1–2.25 lbs/in) of the foam backing. Thus, the carpet may be removed from the flooring substrate without foam delamination. U.S. Pat. No. 3,847,647 teaches the process for applying this acrylic adhesive to the foam backing of a carpet. In U.S. Pat. No. 4,075,377 there is disclosed the use of a mesh installed between the foam backing of a carpet and the substrate so that when an adhesive is applied those areas of the foam backing covered by the mesh are not adhered to the substrate, thereby allowing the carpet and the mesh material to be peeled off subsequently without leaving gross quantities of the foam backing adhering to the flooring substrate. Peel strength for this arrangement is not disclosed.

Chemical Abstracts references 82:157249d and 92:112079p refer respectively to Japanese published patent applications Japanese Kokai 74/128,036 and 79/133,529 and teach that complete adhesion of the foam backing of a carpet to a flooring substrate is achieved using a mixture of a natural rubber latex having a low ammonia content and a talc. The peel strength of such an adhesive is rather low (about 0.1 lb/in) and allows subsequent peeling of the carpet from the flooring substrate without foam delamination.

Water re-moistenable adhesives are well known in the paper field, such as wallpaper, postage stamps, labels etc. as is documented in "Handbook of Adhesives", Chapter 46, Van Nostrand Reinhold, N.Y. 1977. The adhesive is coated on to, for example, a paper layer and dried. The adhesive is activated by contact with water allowing the product to be adhered to a substrate. The adhesive may be subsequently reactivated with water, thereby allowing the product to be separated from the substrate.

U.S. Pat. No. 4,098,944 teaches a mixture of carboxylated styrene-butadiene latex and hydrocarbon wax applied as a layer to the surface of a skinned but not fully dry latex foam rubber backed carpet. This coating imparts abrasion resistance to the latex foam rubber backing.

SUMMARY OF THE INVENTION

This invention provides an adhesive composition which comprises a mixture of a water based polymer in latex form, said latex having a film forming temperature below 25° C., and a thickening agent.

The present invention also provides a process of removably adhering an attached backing of a carpet to a flooring surface by means of an intermediate layer of an adhesive composition, said adhesive composition comprising a mixture of a water based polymer in latex form, said latex having a film forming temperature below 25° C., and a thickening agent, said process comprising applying said adhesive composition as a layer on said flooring surface, putting the outer surface of the attached backing, putting said surface with said applied adhesive layer into contact with the other surface while said adhesive layer is still wet, allowing said adhesive layer to dry thereby adhering said attached backing to said flooring surface, said attached backing being subsequently removable from said flooring surface by reactivating said adhesive layer with water and removing said attached backing from said flooring surface.

The present invention further provides a product having an activatable layer of an adhesive composition, said adhesive composition comprising a mixture of a water based polymer in latex form, said latex having a film forming temperature below 25° C., and a thickening agent, which adhesive layer is provided as a thin uniform dry essentially non-tacky layer on a surface of said product, which adhesive layer is activatable by treatment with water to allow adhesion of said product to a substrate, which adhesive layer is subsequently reactivatable by treatment with water to permit said product to be removed from said substrate.

The present invention still further provides a process of removably adhering a product to a substrate by means of an intermediate activatable adhesive layer, said adhesive layer having been formed by pretreating a surface of said product with a layer of an adhesive composition and then drying said adhesive layer on said surface thereby providing a thin uniform dry essentially non-tacky adhesive layer, said adhesive composition comprising a mixture of a water based polymer in latex form, said latex having a film forming temperature below 25° C., and a thickening agent, said process comprising activating said adhesive layer with water, putting said activated adhesive layer into contact with said substrate, allowing said adhesive layer to dry thereby adhering said product to said substrate, said product being subsequently removable from said substrate by reactivating said adhesive layer with water and removing said product from said substrate.

DETAILED DESCRIPTION AND PREFERRED EMBODIMENTS

In one embodiment of the present invention there is described a product having an activatable adhesive layer. In a further embodiment of the invention there is described a process of removably adhering a product to a substrate. Both of these embodiments will be further described in terms of one preferred embodiment thereof, that is a carpet having an activatable adhesive layer and a process of removably adhering a carpet to a floor. It will be very clear to those skilled in the art that many other embodiments may be described of the invention such as for example the use of the adhesive on a floor or wall tile, the use of the adhesive on a wallpaper product or the use of the adhesive on a label.

In one preferred embodiment, the present invention provides a carpet having an activatable adhesive layer. A suitable carpet preferably has an attached foam backing and the layer of the adhesive composition is present on the outer surface of the attached backing. The adhesive composition comprises a mixture of a water based polymer in latex form, said latex having a film forming temperature below 25° C., and a material generally referred to as a thickening agent. The dry adhesive layer is activated by treatment with water. The adhesive layer, prior to activation, has a dry essentially non-tacky surface which does not need to be covered with a backing paper and which does not adhere to other materials—for example, when the carpet is rolled up in storage the adhesive layer does not adhere to other parts of the carpet with which it is in contact. The activation of the adhesive layer is readily achieved by treatment with water—for example, a spray of water uniformly applied to the adhesive layer rapidly acts to cause activation of the adhesive. The amount of water necessary to activate the adhesive layer is not enough to cause any problems with the foam backing. After allowing the adhesive to dry the strength of the adhesive bond achieved between the carpet backing and the substrate is enough to hold the carpet in place without carpet stretching or bubble formation. The carpet backing adhered to the substrate may be removed readily at a later period in time by the simple expedient of reactivating the adhesive with water—removal of the carpet backing from the substrate is relatively easy, e.g. for replacement purposes, and there is essentially no delamination or rupture of the backing from the carpet with concurrent problems of having to remove portions of the backing from the substrate.

Thus, this embodiment of the invention is a significant advance in the state of the art and largely eliminates difficulties and undesirable effects previously found. A carpet with attached foam backing, being supplied with a dry adhesive layer in place, eliminates the need for the installer to handle an adhesive. Because the carpet is supplied with a dry adhesive layer, there is no dimpling of the carpet by absorption of liquid from a liquid adhesive. The strength of the adhesive is such that the carpet backing is securely attached to the substrate once the adhesive has dried and the peel strength of the adhesive is such as to prevent bubble formation and carpet stretching. The carpet backing may be readily removed by re-wetting the adhesive layer with minimal, if any, delamination of the backing. The presence of the dry adhesive layer increases the abrasion resistance of the foam backing, especially in the case of styrene-butadiene latex foam backings, thereby reducing damage to latex foam backings during normal storage and handling.

In a further preferred embodiment of the invention, there is provided a process of removably adhering a carpet to a substrate. A suitable carpet preferably has an attached foam backing and a dry activatable adhesive layer is present in the outer surface of the attached backing. The process comprises supplying water, preferably in the form of a spray, to the adhesive layer, allowing the adhesive layer to be activated by the water, applying the activated adhesive layer to a substrate, allowing the adhesive layer to dry thereby adhering the carpet backing to said substrate, the carpet backing being removable at a later period in time by reactivating said adhesive layer with water and removing said carpet backing from said substrate.

Carpet suitable for use in the present invention comprises those carpets with a unitary backing so that there is sufficient surface on the back of the carpet that may be brought into contact with the substrate to allow good adhesion to the substrate. Preferably, the carpet is a tufted carpet having the tufts secured in a primary backing and having a secondary resilient foam backing attached to the primary backing. The adhesive in the form of an aqueous mixture, is applied to the foam backing and permitted to dry, thereby forming an adhesive layer which is essentially non-tacky. The secondary backing is preferably made from any of the elastomeric latex foams employed in the art for these purposes, including styrene-butadiene rubber latexes, natural rubber latexes and blends thereof.

Now making reference to the adhesive, the adhesive comprises a mixture of a water based polymer in latex form, said latex having a film forming temperature below 25° C., and material generally referred to as a thickening agent. Suitable polymers include natural rubber, synthetic $C_4$–$C_6$ conjugated diolefin containing polymers, acrylic polymers, mixtures thereof and mixtures of vinyl acetate polymers with $C_4$–$C_6$ conjugated diolefin containing polymers. Preferred among the polymers are $C_4$ conjugated diolefin containing polymers including polychloroprene, butadiene-styrene polymers and polymers of butadiene, styrene, and one or more ethylenically unsaturated carboxylic monomers. Suitable ethylenically unsaturated carboxylic monomers include acrylic, methacrylic, cinnamic, crotonic, itaconic, maleic, fumaric and atropic acids, the $C_1$–$C_6$ alkyl esters of the aforesaid acids, acrylamide, methacrylamide, N-methylolacrylamide and mixtures of such monomers. Butadiene-styrene polymers generally contain from about 25 to about 65 percent by weight of styrene and from about 35 to about 75 percent by weight of butadiene. Polymers of butadiene, styrene and one or more ethylenically unsaturated carboxylic monomers generally contain from about 25 to about 80 percent by weight styrene, from about 20 to about 75 percent by weight butadiene, and from about 0.5 to less than about 3 percent by weight of the carboxylic monomers.

Suitable thickening agents include alkali soluble/swellable aqueous emulsion polymers, salts of polyacrylic acid, water soluble starch, water soluble cellulose derivatives, alkali-sensitive latexes and mixtures thereof. The aqueous emulsion polymers include alkali-soluble/swellable acrylic aqueous emulsion copolymers containing carboxylic acid groups. Suitable such acrylic copolymers include those sold under the tradenames Acrysol ASE-60, Acrysol ASE-75 and Acrysol ASE-95 by Rohm and Haas Company, with the product Acrysol ASE-60 being preferred. A suitable salt of polyacrylic acid is sodium polyacrylate, such as that sold under the tradename Polyresin 5544 by Bate Chemical Company Limited. Water soluble starch is well known in the art. Suitable water soluble cellulose derivatives include methyl ethers, propylene glycol ethers and butylene glycol ethers of methylcellulose. Suitable alkali-sensitive latexes include the latexes of styrene-butadiene-acrylic acid polymers containing from more than about 3 to about 15 percent and preferably from about 8 to about 11 percent, by weight of the polymer of acrylic acid. Mixtures such as Acrysol ASE-60 and water soluble starch, in approximately a 1:1 weight ratio have also been found to be suitable.

The adhesive contains the polymer latex in an amount of from about 50 to about 99.5 parts, preferably from about 80 to about 99 parts, by dry weight of the polymer, and contains the thickening agent in an amount of from about 0.5 to about 50 parts, preferably from about 1 to about 20 parts by dry weight of the thickening agent. The solids content of the adhesive is from about 5 to about 50 percent, preferably from about 5 to about 35 percent, with the balance being water.

The adhesive composition is prepared by diluting the latex component with an amount of water precalculated to give the desired final solids content of the adhesive composition and then adding the thickening agent component with agitation. The pH of the mixture is adjusted to from about 7.5 to about 9.5, preferably from about 8.0 to about 8.5, with for example a concentrated aqueous solution of sodium or potassium hydroxide or ammonia, to provide the adhesive composition.

The adhesive composition may be applied as a layer to a flooring material or to the outer surface of the attached backing of a carpet by suitable means including spraying or brushing in sufficient amount to provide from at least 0.1 to about 3.0 ounces of dry adhesive per square yard of surface (from at least 3.4 to about 102 grams per square meter), preferably from about 0.7 to about 1.5 ounces of dry adhesive per square yard of surface (from about 24 to about 51 grams per square meter). While the adhesive layer is still wet, the surface with the adhesive layer may be contacted with the other surface. The adhesive layer is allowed to dry thereby adhering the carpet backing to the flooring. Subsequently, the adhesive layer may be reactivated with water by suitable means including spraying the interface between the backing and the flooring, and the backing cleanly removed from the flooring.

Alternately, the adhesive may be applied in a similar manner and in similar amounts to a surface of a product and dried thereon by conventional means such as a forced air oven or by heat alone to form a product with an adhesive layer which is essentially non-tacky and not active as an adhesive. The adhesive layer may subsequently be activated with water using for example a spray of water uniformly applied to the adhesive layer, and the adhesive layer is then brought into contact with a substrate and the adhesive layer allowed to dry, thereby adhering the product to the substrate. The adhesive layer may subsequently be reactivated with water as described hereinabove and the product cleanly removed from the substrate.

Having now described various embodiments of the invention, it will be illustrated by the following examples:

EXAMPLE 1

The adhesive compositions of the present invention comprise mixtures of a latex component and a thickening agent component. The latexes listed in Table I and the thickening agents listed in Table II were used in the following examples. All parts are by weight.

TABLE I

| Latex | Description |
| --- | --- |
| Latex A | Natural rubber latex with 61.9 percent solids content |
| Latex B | Synthetic latex of a polymer comprising 41.8 parts styrene, 56 parts butadiene and 2.2 parts itaconic acid, with 50.1 percent solids content. |
| Latex C | Synthetic latex of a polymer comprising 30 parts styrene and 70 parts butadiene, with 71 percent solids content. |
| Latex D | Synthetic latex of a polymer comprising 58 parts styrene, 39.8 parts butadiene and 2.2 parts itaconic acid, with 50 percent solids content. |
| Latex E | Synthetic latex of a polymer comprising 77 parts styrene, 20.6 parts butadiene and 2.4 parts itaconic acid, with 51 percent solids content. |
| Latex F | Synthetic latex of an acrylic polymer sold under the tradename Primal B-15 by Rohm and Haas Company, with 46 percent solids content. |
| Latex G | Synthetic latex of polyvinyl acetate sold under the tradename Resyn 25-1105 by NACAN Products Limited, with 46.3 percent solids content. |
| Latex H | Synthetic latex of polychloroprene sold under the tradename Neoprene latex 842A by E. I. Du Pont de Nemours and Company, with 49.5 percent solids content. |
| Latex I | Synthetic latex of a polymer comprising 60 parts styrene, 38.5 parts butadiene, 0.75 part itaconic acid and 0.75 part acrylic acid, with 50 percent solids content. |

TABLE II

| Thickening Agent | Description |
| --- | --- |
| Thickener A | Carboxylic acid group-containing alkali swellable acrylic aqueous emulsion copolymer sold under the tradename Acrysol ASE-60 by Rohm and Haas Company with 28.3 percent solids content |
| Thickener B | Carboxylic acid group-containing alkali soluble acrylic aqueous emulsion copolymer sold under the tradename Acrysol ASE-75 by Rohm and Haas Company with 40 percent solids content |
| Thickener C | Carboxylic acid group-containing alkali soluble acrylic aqueous emulsion copolymer sold under the tradename Acrysol ASE-95 by Rohm and Haas Company with 22 percent solids content. |
| Thickener D | 13.8 percent by weight aqueous solution of Sodium polyacrylate sold under the tradename of Polyresin 5544 by Bate Chemical Company Limited. |
| Thickener E | 20 percent by weight aqueous solution of natural starch which has been steam cooked and solubilized. |
| Thickener F | Alkali sensitive latex of a polymer comprising 50.1 parts styrene, 40.0 parts butadiene and 9.9 parts acrylic acid, with 48 percent solids content. |
| Thickener G | Hydroxypropyl methylcellulose sold under the tradename Methocel 90HG by Dow Chemical Company and used as a 1.5 |

TABLE II-continued

| Thickening Agent | Description |
| --- | --- |
| | percent aqueous solution. |

Example 1 illustrates the method of making an adhesive composition of the present invention with a final solids content of about 10 percent. The latex component of the mixture is first diluted with a precalculated amount of water to give the desired final solids content of the adhesive composition and then the thickening agent component is added with agitation. Thus 179.6 grams of Latex B, containing 90.0 grams of the polymer of Latex B and 89.6 grams of water, were diluted with 885.1 grams of water and then 35.3 grams of Thickener A, containing 10.0 grams of the copolymer of Thickener A and 25.3 grams of water, were added with agitation. The resulting mixture contained a total of 100.0 grams of solids and 1000 grams of water. The pH of this mixture was then adjusted to 8.0 with a 28 percent aqueous solution of ammonia to produce the final adhesive composition.

EXAMPLES 2-6

Examples 2-6 illustrate the process of applying the adhesive compositions of the present invention in a layer to the attached backing of a carpet, and while the adhesive layer is still wet, adhering the attached backing to a flooring surface. After allowing the adhesive layer to dry, the adhesive layer is reactivated with water to permit the carpet backing to be removed from the flooring.

The adhesive composition used in these examples was that described in Example 1. The adhesive was brushed or sprayed onto the carpet backing in an amount to provide about 1 ounce of dry adhesive per square yard of surface (about 34 grams per square meter). The carpet backing with the still moist adhesive layer was laid on the flooring from about 0.5 to about 2 hours after the adhesive was applied and then allowed to dry for from about 16 to about 24 hours. The adhesion between the carpet backing and the flooring was then measured using the 180° peel strength obtained using Test Procedure No. 1 of the Pressure Sensitive Tape Council using 2 inch by 6 inch samples of carpet.

Three different flooring surfaces were used namely vinyl tile, unsealed plywood and plywood sealed with a white shellac sold under the tradename Cilux Finishes by Canadian Industries Limited. Five carpets with different attached backings well known to the art were deadhered to the flooring surfaces. The attached backing materials were a styrene-butadiene latex no-gel foam, a polyurethane foam known as Kangeback (process of Textile Rubber & Chemical Company), jute, polypropylene and a crushed styrene-butadiene latex gelled foam known a unitary rubber backing. Peel strength values obtained are listed in Table III and show that the adhesive provides good to excellent adhesion for a wide variety of carpet backings to several different flooring surfaces. Peel strength from unsealed plywood was not measured in Examples 3-6 inclusive.

TABLE III

| | | Peel Strength (lb/in) from: | | |
| --- | --- | --- | --- | --- |
| Example No. | Carpet Backed with | Vinyl Tile | Sealed Plywood | Unsealed Plywood |
| 2 | S-B latex no-gel foam | 0.6 | 0.9 | 1.0 |
| 3 | Kangeback | 3.7 | 1.0 | — |
| 4 | Jute | 1.9 | 1.1 | — |
| 5 | Polypropylene | 0.7 | 0.5 | — |
| 6 | Unitary rubber backing | 1.1 | 1.8 | — |

In order to remove the above carpet backings from the flooring surfaces, a corner of the backing was lifted from the flooring and the adhesive reactivated by spraying the interface between the backing and the flooring with water as the backing was peeled back from the flooring. In this way, each of the carpet backings was cleanly removed from each of the flooring surfaces used.

EXAMPLES 7-24

Examples 7-24 illustrate a carpet having an activatable adhesive layer and a process of removably adhering the carpet to a floor. The carpet used in all of these examples was a tufted carpet with an attached secondary resilient backing of styrene-butadiene latex no-gel foam which is well known to the art. The adhesive compositions used were mixtures as shown in the following Table IV and were made up in a manner similar to that described in connection with Example 1. Each adhesive composition had a solids content of about 10 percent and was adjusted to a pH of about 8.0 with ammonium hydroxide as required and was sprayed onto the outer surface of the foam backing of the carpet in an amount to provide about 1 ounce of dry adhesive per square yard of carpet backing (about 34 grams per square meter) and the adhesive layer was dried by placing the carpet in a forced air oven at about 135° C. for about ten minutes and then at room temperature for about 24 hours. Test pieces of about 2 inches by 6 inches were used for adhesion tests. Each test piece was sprayed with water to activate the adhesive and then placed in contact with the flooring material to be used. The flooring materials used were the same three described in Examples 2-6. The adhesive layer was allowed to dry for about 24 hours. Peel strength values were also obtained as described in Examples 2-6.

TABLE IV

| Example No. | Adhesive Composition | | Peel Strength (lb/in) from: | | |
| --- | --- | --- | --- | --- | --- |
| | Latex | Thickening Agent | Vinyl Tile | Sealed Plywood | Unsealed Plywood |
| 7 | 90 parts Latex B | 10 parts Thickener A | 0.6 | 0.9 | — |
| 8 | 95 parts Latex B | 5 parts Thickener A | 1.6 | 0.4 | — |
| 9 | 85 parts Latex B | 15 parts Thickener A | — | 0.3 | — |
| 10 | 90 parts Latex B | 10 parts Thickener B | 1.4 | 0.5 | — |
| 11 | 90 parts Latex B | 10 parts Thickener C | 1.6 | 0.6 | — |
| 12 | 90 parts Latex B | 10 parts Thickener D | — | 0.2 | — |
| 13 | 75 parts Latex B | 25 parts Thickener E | 0.4 | 0.2 | — |
| 14 | 80 parts Latex B | 20 parts Thickener E | 0.9 | 0.5 | — |
| 15 | 90 parts Latex B | 10 parts Thickener E | 0.7 | 0.6 | — |
| 16 | 80 parts Latex B | 10 parts each of Thickeners A and E | 0.5 | 1.0 | 0.2 |

TABLE IV-continued

| Example No. | Adhesive Composition | | Peel Strength (lb/in) from: | | |
| --- | --- | --- | --- | --- | --- |
| | Latex | Thickening Agent | Vinyl Tile | Sealed Plywood | Unsealed Plywood |
| 17 | 90 parts Latex B | 10 parts Thickener G | 0.4 | 0.3 | — |
| 18 | 90 parts Latex I | 10 parts Thickener A | 0.7 | 0.3 | — |
| 19 | 90 parts Latex C | 10 parts Thickener A | 1.5 | 1.1 | — |
| 20 | 90 parts Latex C | 10 parts Thickener F | 0.5 | — | — |
| 21 | 90 parts Latex A | 10 parts Thickener A | 0.2 | 0.6 | — |
| 22 | 45 parts each of Latexes B and G | 10 parts Thickener A | 2.0 | 0.9 | — |
| 23 | 90 parts Latex F | 10 parts Thickener A | 0.8 | 0.1 | — |
| 24 | 90 parts Latex H | 10 parts Thickener A | 1.0 | 1.5 | — |

It can be seen from the data in Table IV that the combinations of latex and thickening agent shown provide an acceptable bond for the carpet backings to either the vinyl tile or sealed plywood floor surfaces. For most of the above examples, data could not be obtained for the unsealed plywood flooring as little or no bonding developed. It appears that it is necessary to seal a wood floor before adhering thereto a carpet according to the present invention. As described in connection with Examples 2-6, the carpet backings were easily removed from the flooring surfaces by reactivating the adhesive layer with water.

A further test was run in order to estimate the performance of the adhesive composition in adhering the carpet backing to the flooring surface. Circular samples of the same carpet of about 30 inch diameter were coated with the adhesive composition used in Example 7 and dried as before. The adhesive layer of each sample was then activated and the carpet backing adhered to a surface of the same diameter. Four surfaces were used namely vinyl tile, plywood sealed as described in Examples 2-6, unsealed concrete and concrete sealed with an acrylic latex paint sold under the tradename Resilacrete by Lepage's Limited. After the adhesive was allowed to air dry at room temperature for 24 hours, each of the surfaces with their attached carpets was mounted on the rotating platform of a Rollstuhl tester. A set of three castors loaded with a total of 75 pounds of weight were rubbed against the carpet using a circular motion while the platform rotated in the opposite direction. The direction of these rotations switched automatically on a periodic basis. After 50,000 cycles, no adhesive failure was observed with any of the four flooring substrates. The carpet was removed after completion of the test by reactivating the adhesive interface with water as described above.

EXAMPLE 25

This example was similar to those of Examples 7-24 except that a Kangeback polyurethane foam backed carpet was substituted for the styrene-butadiene latex no-gel foam backed carpet. The adhesive composition used in Example 7 was coated on the foam surface and dried as described in Examples 7-24. The adhesive layer was then activated with a uniform spray of water, placed in contact with a vinyl tile flooring surface, and allowed to dry for about 24 hours. The peel strength was obtained as described in Examples 2-6 and was found to be 0.4 lb/in.

EXAMPLES 26-28

These examples illustrate the use of the adhesive composition of the present invention to provide improved abrasion resistance to the surface of styrene-butadiene latex foam backed carpets. Two adhesive compositions shown in Table V were coated on the foam surface and dried as described in Examples 2-6. The abrasion resistance of these two samples was compared to that of an uncoated foam using a Model 503 Standard Abrasion Tester from Taber Instrument Corporation. A 13 cm sample of each carpet was mounted on the rotating disk and two freely rotating abrasive wheels made from Calibrase CS-17 each operating under a 500 gram load were placed against the foam surface in a plane perpendicular to that surface. The rotating disk was rotated under the wheels and the number of cycles of rotation of the disk before the rupture of surface of the foam was used to indicate relative abrasion resistance. These data are recorded in the following Table V.

TABLE V

| Example No. | Adhesive Composition | | No. of Cycles to Rupture of Foam Surface |
| --- | --- | --- | --- |
| | Latex | Thickening Agent | |
| 25 | 0 | 0 | 70 |
| 26 | 90 parts Latex B | 10 parts Thickener A | 350 |
| 27 | 90 parts Latex D + 10 parts Latex E | 5 parts Thickener D | 160 |

These examples clearly demonstrate the improvement in abrasion resistance imparted by the adhesive coating of the present invention.

What is claimed is:

1. A rewettable adhesive comprising from about 80 to 99 parts by dry weight of a latex of a polymer having a film forming temperature below 25° C. selected from the group natural rubber, chloroprene, co-polymers consisting of from about 25-65 weight % styrene and from about 35 to 75 weight % of a $C_{4-6}$ conjugated diolefin; terpolymers consisting of from about 25 to 80 weight % styrene, from about 20 to 75 weight % of a $C_{4-6}$ conjugated diolefin; and from about 0.5 to 3 weight % of a functional monomer selected from $C_{3-9}$ ethylenically unsaturated carboxylic acids, $C_{1-6}$ alkyl esters of such ethylenically unsaturated carboxylic acids, and amide derivatives of such ethylenically unsaturated acids which may be unsubstituted or substituted at the nitrogen atom by a $C_{1-4}$ alkyl or alkanol radical; and from about 20 to 1 parts by dry weight of a thickening agent selected from water soluble starch, water soluble cellulose derivatives, and alkali sensitive latices which are terpolymers of styrene, $C_{4-6}$ conjugated diolefins and acrylic acid.

2. The adhesive composition of claim 1 wherein said polymer is a polymer of butadiene, styrene and one or more functional monomers selected from the group consisting of acrylic acid, methacrylic acid, cinnamic acid, crotonic acid, itaconic acid, maleic acid, fumaric acid, atopic acid, the $C_1$–$C_6$ alkyl esters of the aforesaid acids, acrylamide, methacrylamide and N-metholacrylamide.

3. The adhesive composition of claim 2 wherein said thickening agent is a water soluble ether of methylcellulose.

4. The adhesive composition of claim 2 wherein said thickening agent is an alkali sensitive latex of a polymer of styrene, butadiene and from about 3 to about 15 weight % of acrylic acid.

5. An adhesive composition according to claim 1 wherein said polymer is a copolymer of styrene and a $C_{4-6}$ conjugated diolefin.

6. An adhesive according to claim 5 wherein said thickening agent is a water soluble ether of methylcellulose.

7. An adhesive according to claim 5 wherein said thickening agent is an alkali sensitive terpolymer of styrene, butadiene and from about 3 to about 15 weight % of acrylic acid.

* * * * *